US006174972B1

(12) United States Patent
Daire

(10) Patent No.: US 6,174,972 B1
(45) Date of Patent: Jan. 16, 2001

(54) ALKYLATION PROCESS

(75) Inventor: Erick Daire, Chateauneuf-les-Martigues (FR)

(73) Assignee: BP Chemicals Limited (GB)

( * ) Notice: Under 35 U.S.C. 154(b), the term of this patent shall be extended for 0 days.

(21) Appl. No.: 08/901,930

(22) Filed: Jul. 29, 1997

Related U.S. Application Data

(63) Continuation of application No. 08/576,349, filed on Dec. 21, 1995, now abandoned.

(30) Foreign Application Priority Data

Jan. 18, 1995 (GB) .................................................. 95 00788

(51) Int. Cl.[7] ........................................................ C08F 4/42
(52) U.S. Cl. ........................ 526/144; 526/160; 526/905; 502/152; 502/104
(58) Field of Search ..................................... 526/144, 905, 526/160; 502/152, 104

(56) References Cited

U.S. PATENT DOCUMENTS

| | | | | |
|---|---|---|---|---|
| 4,939,217 | * | 7/1990 | Stricklen | 526/905 |
| 4,962,262 | * | 10/1990 | Winter et al. | 526/905 |
| 5,023,388 | * | 6/1991 | Luker | 585/9 |
| 5,049,535 | * | 9/1991 | Resconi et al. | 526/160 |
| 5,126,303 | * | 6/1992 | Resconi et al. | 502/117 |
| 5,397,757 | * | 3/1995 | Mink et al. | 502/115 |
| 5,539,068 | * | 7/1996 | Devore et al. | 526/126 |

FOREIGN PATENT DOCUMENTS

| | | |
|---|---|---|
| 0277003 | 8/1988 | (EP) . |
| 0459320 | 12/1991 | (EP) . |
| 0602509 | 6/1994 | (EP) . |
| 63-218707 | * 9/1988 | (JP) . |

OTHER PUBLICATIONS

Only English translation furnished.*
Makromol. Chem., Macromol. Symp., vol. 66, Fevrie 1993 Basel, pp. 157–178m XP 003605001, Herfert N "Hemiisotactic polypropylene" p. 166, alinea 4—p. 167; tableau 3.
Rapra Abstracts, vol. 9, No. 37, Sep. 11, 1972 Belov GP 'Molecular weight and mwd of polyethylene produced by a continuous process'.
Makromol. Chem., vol. 190, No. 11110, Oct. 1989 Basel, pp. 2357–2361, XP 000136160 Longo P 'Behaviour of homogenous catalysts for propene polymerization in ethylene chloride'.

* cited by examiner

*Primary Examiner*—David W. Wu
*Assistant Examiner*—Ling-Siu Choi
(74) *Attorney, Agent, or Firm*—Morgan & Finnegan, L.L.P.

(57) ABSTRACT

The present invention relates to a process for polymerizing at least one olefin with the aid of a catalyst containing at least one organometallic compound of a transition metal possessing at least one ligand of cyclopentadienyl or substituted cyclopentadienyl type. The polymerization is carried out in gas phase or in suspension in a liquid polymerization medium selected amongst saturated or unsaturated hydrocarbons, in the presence of hydrogen and a polymerization component selected amongst halogenated hydrocarbons. The combined use of hydrogen and halogenated hydrocarbon in such a polymerization process simultaneously improves the catalyst activity and the molecular weight control of the polymer.

14 Claims, No Drawings

ALKYLATION PROCESS

This application is a continuation of application Ser. No. 08/576,349, filed Dec. 21, 1995 abandoned.

The present invention relates to a process for polymerization of an olefin such as ethylene in the presence of catalyst systems including a catalyst in the form of an organometallic compound of a transition metal which has at least one ligand of cyclopentadienyl or substituted cyclopentadienyl type.

It is known to polymerize olefins such as ethylene with the aid of a catalyst comprising an organometallic compound of a transition metal from groups IVA, VA or VIA of the Periodic Classification of the elements (IUPAC version in CRC Handbook of Chemistry and Physics, 73rd Edition, CRC Press Inc., 1992–1993) a metal such as titanium, zirconium or hafnium and possessing at least one ligand of cyclopentadienyl or substituted cyclopentadienyl type. In particular, catalysts comprising metallocene complexes such as zirconocenes, titanocenes or hafnocenes, in particular (cyclopentadienyl)$_2$ZrCl$_2$, are known as catalysts in the polymerization of olefins in the presence of an appropriate cocatalyst. Such catalyst systems have proved their very high activity in the polymerization of ethylene and of alpha-olefins by giving polyolefins of very narrow molecular mass distribution.

It has been observed, however, that the use of hydrogen in polymerization with a catalyst containing an organometallic compound of a transition metal possessing at least one ligand of cyclopentadienyl or substituted cyclopentadienyl type, for example a catalyst comprising a zirconocene, a titanocene or a hafnocene, can in some cases considerably reduce the activity of the catalyst system in the olefin polymerization, until the polymerization reaction is completely blocked.

EP 0 459 320 relates to a process for polymerizing olefin with the help of a metallocene catalyst system in solution or in suspension. Halogenated hydrocarbon solvent can be particularly used as liquid polymerization medium.

EP 0 602 509 relates to a process for polymerizing olefin with the help of a metallocene catalyst system in suspension in a liquid medium selected amongst hydrocarbons or halogenated hydrocarbons.

A process has now been found which allows the abovementioned problems to be solved. In particular, a process has been found for olefin polymerization in the presence of catalyst systems including a catalyst as mentioned above, a process which makes it possible at the same time to maintain a sufficiently high activity in polymerization and to control the molecular mass of the polyolefins especially with the aid of hydrogen.

The subject of the present invention is therefore a process for polymerization of at least one olefin with the aid of a catalyst system including a catalyst containing at least one organometallic compound of a transition metal possessing at least one ligand of cyclopentadienyl or substituted cyclopentadienyl type, characterized in that the polymerization is carried out in gas phase or in suspension in a liquid polymerization medium selected amongst saturated or unsaturated hydrocarbons, in the presence of hydrogen and a polymerization component selected amongst halogenated hydrocarbons.

The halogenated hydrocarbon may include one or more halogen atoms such as fluorine, chlorine or bromine. It contains preferably one or more chlorine atoms. It may correspond to the general formula

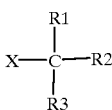

in which X denotes a halogen atom such as fluorine, chlorine or bromine and $R_1$, $R_2$ and $R_3$, being identical or different, denote a halogen atom such as fluorine, chlorine or bromine, a hydrogen atom, an alkyl radical optionally halogenated containing, for example, from 1 to 7, preferably from 1 to 5 carbon atoms, such as the methyl or ethyl radical, or from 0 to 5, preferably from 0 to 3 halogen atoms such as fluorine, chlorine or bromine, an aryl radical optionally halogenated containing, for example, from 6 to 10, preferably from 6 to 8 carbon atoms, such as the phenyl radical and from 0 to 5, preferably from 0 to 3 halogen atoms such as fluorine, chlorine or bromine, or an aralkyl radical optionally halogenated containing, for example, from 7 to 14, preferably from 7 to 11 carbon atoms, such as the benzyl radical and from 0 to 5, preferably from 0 to 3 halogen atoms such as fluorine, chlorine or bromine.

The halogenated hydrocarbon may be chosen in particular from the group consisting of chloromethane, dichloromethane, chloroform, carbon tetrachloride, dichloromonofluoromethane, dichlorodifluoromethane, 1,2-dichloroethane, 1,1-dichloroethane, 1,1,1-trichloroethane, tert-butyl chloride and benzyl chloride. Chloroform is preferred.

The catalyst system includes a catalyst comprising at least one organometallic compound of a transition metal from Groups IVA, VA or VIA of the Periodic Classification of the Elements, in particular a metal from Group IVA, such as titanium, zirconium or hafnium and possessing at least one ligand of cyclopentadienyl or substituted cyclopentadienyl type.

The catalyst may comprise at the same time an organometallic compound of a transition metal possessing at least one ligand of cyclopentadienyl or substituted cyclopentadienyl type, and a compound of a transition metal identical with or different from the first, not being organometallic and/or not possessing this type of ligand, for example being in the form of a polyhalide or of a polyalcoholate or of a polyhaloalcoholate of a metal from groups IVA or VA, such as titanium, vanadium or zirconium, in particular a titanium or vanadium tetrahalide, a titanium or vanadium trihalomonoalcoholate, a titanium or vanadium dihalodialcoholate, a titanium or vanadium monohalotrialcoholate, a titanium or vanadium tetraalcoholate, a vanadyl trihalide, a vanadyl dihalomonoalcoholate, a vanadyl monohalodialcoholate or a vanadyl trialcoholate.

The catalyst comprises at least one organometallic compound of a transition metal possessing at least one ligand of cyclopentadienyl or substituted cyclopentadienyl type, compound which may preferably correspond to one of the following general formulae:

or

in which Me denotes an atom of transition metal from groups IVA, VA or VIA, preferably from group IVA, of the Periodic Classification of the Elements, (C$_5$R'$_m$) denotes a cyclopentadienyl or substituted cyclopentadienyl radical, each R', being identical or different, denotes a hydrogen atom or an alkyl, alkylene, aryl or aralkyl radical containing, for example, from 1 to 20 carbon atoms, or two substituents R' together form a condensed ring containing, for example, from 4 to 6 carbon atoms, R" denotes an alkylene radical containing, for example, from 1 to 4 carbon atoms, a dialkylgermanium or a silicon atom or an alkylphosphine radical or an amine radical joining the two $(C_5R'_m)$ rings via a bridge, each Q, being identical or different, denotes an aryl, alkyl, alkylene or aralkyl radical containing, for example, from 1 to 20 carbon atoms or a halogen atom such as chlorine or bromine, Q' denotes an alkylidene radical containing, for example, from 1 to 20 carbon atoms, s is 0 or 1, p is 1 or 2; on condition that s is 0 when p is 0; m is 4 when s is 1; m is 5 when s is 0; or the general formula:

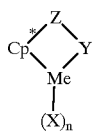

(III)

in which Me denotes an atom of transition metal from groups IVA, VA or VIA, preferably from group IVA,, of the Periodic Classification of the Elements, $C_p^*$ denotes a cyclopentadienyl or substituted cyclopentadienyl radical bound in an $\eta_5$ bonded mode to Me, Z denotes a divalent group including boron or an element from group IVB and optionally sulphur or oxygen, the said group containing, for example, not more than 20 nonhydrogen atoms, and optionally $C_p^*$ and Z together form a condensed ring, each X, being identical or different, denotes an anionic ligand or a neutral Lewis base containing, for example, not more than 30 nonhydrogen atoms, n is 0, 1, 2, 3 or 4, depending on the valency of Me, and Y denotes an anionic or non-anionic ligand, bonded to Z and Me, including nitrogen, phosphorus, oxygen or sulphur and containing, for example, not more than 20 nonhydrogen atoms and, optionally, Y and Z together form a condensed ring.

In the definitions given above the intended meanings are:

alkyl radical: in particular the methyl ($CH_3$—), ethyl ($CH_3CH_2$—), n-propyl ($CH_3CH_2CH_2$—) and n-butyl ($CH_3CH_2CH_2CH_2$—) radicals;

alkylene radical: a monovalent radical also called alkynyl, corresponding to the ethylenic carbon compounds, such as the vinyl ($CH_2$=CH—), allyl or β-propenyl ($CH_2$=CH—$CH_2$—) and g-butenyl ($CH_2$=CH—$CH_2$—$CH_2$—) radicals;

aryl radical: in particular the phenyl radical;

aralkyl radical: in particular the benzyl radical;

alkylene radical: a divalent radical such as the methylene (—$CH_2$), ethylene or dimethylene (—$CH_2$—$CH_2$—), propylene (—$CHCH_3$—$CH_2$—), trimethylene (—$CH_2$—$CH_2$—$CH_2$—), butylene (—$CHC_2H_5$—$CH_2$—) and (—$CHCH_3$—$CHCH_3$—(, butylene (—$CH_2$—$CH_2$—$CH_2$—$CH_2$—) radicals;

alkylidene radical: a divalent radical or R—CH= type where R denotes an alkyl radical, in particular the ethylidene ($CH_3$—CH=), propylidene ($CH_3$—$CH_2$—CH=) or (($CH_3$)$_2$C=) and butylidene ($CH_3$—$CH_2$—$CH_2$—CH=) radicals.

(See Dictionaire de la Chimie et de ses Applications, 3rd edition, by C. Duval and R. Duval, published by Technique et Documentation, 1978).

By way of example, Z may be $SiR_2^*$, $CR_2^*$, $SiR_2^*SiR_2^*$, $CR_2^*CR_2^*$, $CR^*$=$CR^*$, $CR_2^*SiR_2^*$, $GeR_2^*$, $BR^*$ or $BR_2^*$ where $R^*$, being identical or different, may denote a hydrogen atom or an alkyl, aryl, silyl, germyl, aryloxy, alkoxy, amide or siloxy radical.

The process of the present invention is particularly suitable for use with high activity polymerization catalysts for example metallocenes.

Metallocene catalysts may suitably be represented by the general formula:

wherein Cp is a substituted or unsubstituted cyclopentadienyl ring; M is a Group IVA, VA or VIA transition metal in particular Zr, Ri, Hf, R and $R^1$ are independently hydrocarbyl having 1–20 carbon atoms, halogen or other suitable monovalent ligand, m=1–3, x=0–3 and y=0–3 wherein the sum of m, x and y equal the oxidation state of M.

Examples of such metallocene catalysts may be found in the disclosure of EP 129368, U.S. Pat. No. 5,324,800 and EP 206794.

The polymerization catalyst may also be represented by a monocyclopentadienyl heteroatom containing compound. Such catalysts are disclosed in for example EP 416815 and EP 420436.

Such high activity polymerization catalysts may be used in the presence of suitable cocatalysts for example aluminoxanes. Other cocatalysts which may be used include trialkylaluminium compounds, ionic activators or compounds which ionize the catalysts e.g. boranes.

The catalyst employed in the process of the invention may be in particular a metallocene complex such as a titanocene, zirconocene or hafnocene complex, which may be employed as such, for example in the form of a liquid or a solution, or preferably in the form of a solid e.g. supported on an organic or inorganic support such as a refractory oxide, for example silica.

The catalyst may be employed as it is or in the form of an olefin prepolymer obtained by a precontacting of the catalyst with an olefin, preferably in the presence of an appropriate cocatalyst like one of those mentioned.

The cocatalyst may be an organometallic compound which has a metal from groups IA, IIA, IIB or IIIB of the Periodic Classification of the elements. The metals are preferably chosen from the group including lithium, aluminium, magnesium, zinc or boron. Such cocatalysts are known for their use in olefin polymerization and include especially organoaluminium compounds such as trialkylaluminiums, alkylaluminium hydrides, alkylaluminium halides and alkylaluminium alcoholates. Each of the alkyl or alcoholate radicals may preferably contain from 1 to 16 carbon atoms. It is possible, for example, to employ trimethylaluminium, triethylaluminium, diethylaluminium hydride, triisobutylaluminium, trioctylaluminium, tridecylaluminium, tridodecylaluminium, diethylaluminium methanolate, diethylaluminium ethanolate, diethylaluminium phenolate, diethylaluminium chloride, ethylaluminium dichloride, methylaluminium diethanolate and methylaluminoxane. It is preferred to employ alkylaluminoxanes, the alkyl radical containing, for example, from 1 to 10 carbon atoms, in particular methylaluminoxane.

The cocatalyst may be employed in a quantity such that the atomic ratio of the transition metal of the catalyst to the metal of the cocatalyst is from 1:10000 to 10000:1 in the case of the alkyl-aluminoxanes and from 1:100 to 100:1 in the case of the other organometallic compounds.

The halogenated hydrocarbon may be introduced into the polymerization mixture either at the beginning of polymerization or preferably continuously throughout the period of polymerization, especially when the latter is itself carried out as a continuous process. The halogenated hydrocarbon is preferably employed in a sufficient quantity to obtain the required effect, especially on the catalytic activity in polymerization and on the control of the molecular mass of the polyolefin manufactured. In particular, the quantity of halogenated hydrocarbon which is employed may be such that the ratio of the number of moles of the halogenated hydrocarbon to the number of gram-atoms of transition metal of the catalyst is from 1:10000 to 100:1, preferably from 2:10000 to 50:1, in particular from 5:10000 to 20:1.

The halogenated hydrocarbon may be employed as such, for example in the form of a gas or of a liquid, or preferably in the form of a solution in a hydrocarbon solvent, in particular an alkane or cycloalkane containing, for example, from 4 to 10 carbon atoms, or a mixture of two or more of these alkanes or cycloalkanes, such as n-hexane or n-heptane.

The polymerization may be carried out in suspension in a liquid polymerization medium selected amongst saturated hydrocarbons, for example an alkane or cycloalkane containing especially from 4 to 10 carbon atoms, or a mixture of these alkanes or cycloalkanes, such as n-hexane or n-heptane, and amongst unsaturated hydrocarbons which in this case may be the olefin to be polymerized, in particular one or more olefins containing, for example, from 3 to 10, preferably from 3 to 8 carbon atoms.

The polymerization may be advantageously carried out in an essentially gaseous polymerization medium, that is to say in gas phase, especially in a reactor containing a fluidized and/or mechanically stirred bed, such as those described in French Patents No. 2 207 145, No. 2 335 526 and No. 2 634 486. In this case the polymerization medium consists essentially of a gas mixture containing the olefins(s) to be polymerized, hydrogen and optionally at least one inert gas, in particular nitrogen or a saturated hydrocarbon such as an alkane or cycloalkane containing, for example, from 1 to 6, preferably from 2 to 5 carbon atoms, such as ethane, propane, n-pentane or isopentane. The polymerisation may be carried out according to the process disclosed in WO 94/28 032.

The polymerization is preferably carried out at a temperature of 30 to 180° C., preferably of 30 to 110° C., in particular of 50 to 100° C., at a total pressure of 0.1 to 6 MPa, preferably of 0.5 to 5 MPa.

The process of the invention is suitable for polymerizing one or more olefins containing, for example, from 2 to 10, preferably from 2 to 8 carbon atoms, in particular ethylene or propylene, or ethylene with at least one other olefin containing, for example, from 3 to 10, preferably from 3 to 8 carbon atoms.

Hydrogen is employed during the polymerization preferably in a sufficient quantity to control the molecular mass of the polyolefins manufactured. The quantity of hydrogen may be such that the ratio of the partial pressure of hydrogen to that of the olefin(s) is from 1:10000 to 1:10, preferably from 1:10000 to 1:100, in particular from 5:10000 to 5:100.

The process of the invention is additionally very particularly suitable for carrying out a continuous polymerization of olefin(s) in suspension or gas phase. It is preferred to carry out a continuous gas phase polymerization in which a gas mixture containing the olefin(s) to be polymerized, hydrogen and optionally an inert gas is brought into contact with the halogenated hydrocarbon and the catalyst system including the catalyst containing at least one organometallic compound of a transition metal possessing at least one ligand of cyclopentadienyl or substituted cyclopentadienyl type, and the appropriate cocatalyst, at a temperature of 30 to 110° C., preferably of 50 to 100° C., at a total pressure of 0.1 to 6 MPa, preferably of 0.5 to 5 MPa. In practice the process for continuous polymerization of olefin(s) in a gaseous polymerization medium includes the continuous introduction of the olefin(s), of hydrogen, of the halogenated hydrocarbon and optionally of an inert gas, and the continuous or semi-continuous introduction of the catalyst system into the gaseous polymerization medium and the continuous or semi-continuous drawing-off of the manufactured polyolefin from the said gaseous polymerization medium, in temperature and pressure conditions which may be those preferably mentioned above.

It is particularly surprising to find that the use of a halogenated hydrocarbon such as chloroform, generally known for its inhibiting effect in olefin polymerization, should be capable of restoring the catalyst activity to a very high level, especially when hydrogen is employed in the presence of a catalyst containing an organometallic compound of a transition metal possessing at least one ligand of cyclopentadienyl or substituted cyclopentadienyl type. Not only is it observed that the catalyst activity is restored by virtue of the use of the halogenated hydrocarbon, but also the hydrogen can fully play its part as chain transfer agent and thus control the molecular mass of the polyolefins.

Means which are known per se can be employed in the control of the density of the polyolefin, in particular of the polyethylene, especially the use of a comonomer such as an olefin containing from 3 to 10, preferably from 3 to 8 carbon atoms, with ethylene, thus enabling the density of the polyethylene to be lowered, for example, from 0.960 to 0.900 g/cm$^3$.

The present invention makes it possible especially to manufacture polyolefins such as polyethylenes which have a relatively high melt index, for example a melt index $MI_{2.16}$ (according to ASTM-D-1238-condition E) ranging from 0.1 to 200, preferably from 1 to 150 g/10 minutes, while maintaining a relatively low residual content of transition metal, for example of a value lower than 1 to 20, preferably a value lower than 1 to 10 parts by weight per million (ppm). The molecular mass distribution of the polyethylenes thus obtained may be very narrow, especially with an Mw:Mn ratio (ratio of the weight-average molecular mass to the number-average molecular mass) ranging from 1.8 to 4.5, in particular from 1.8 to 3, or, on the contrary, very wide, especially with an Mw:Mn ratio ranging from 10 to 35, in particular from 15 to 30, when the catalyst system contains a catalyst containing an organometallic compound of transition metal possessing at least one ligand of cyclopentadienyl or substituted cyclopentadienyl type, and a compound of transition metal not possessing any ligand of cyclopentadienyl or substituted cyclopentadienyl type.

The following nonlimiting examples illustrate the present invention.

Example 1

Preparation of a catalyst based on a hafnocene

1. Preparation of bis(γ-butenylcyclopentadienyl)-dichlorohafnium

Stage (a): Preparation of γ-butenyl 1-tosylate 29.3 millimoles of 3-buten-1-ol are added to a solution of 525 millimoles of p-toluenesulphonyl chloride in 200 ml of anhydrous pyridine cooled to 0° C. The mixture thus obtained is kept stirred overnight at −5° C. It is then added with stirring to a mixture of 200 g of water and ice. An oily product is extracted from the aqueous mixture by 3 ether washes, each of 300 ml. The ether fractions are washed twice with 300 ml of a cold solution of hydrochloric acid (HCl:water being 1:1 by weight) to remove pyridine, and then with 300 ml of water, and are then dried over potassium carbonate and sodium sulphate and decolorized with active carbon. The suspension is filtered and the ether is evaporated from the filtrate at reduced pressure to leave an oily product. The oily product is then washed with cold pentane to remove the impurities and obtain γ-butenyl 1-tosylate.

Stage (b): Preparation of γ-butenylcyclopentadiene 68.9 ml of a 2.0M solution of cyclopentadienyl sodium in tetrahydrofuran (THF) are added to a solution of 100 millimoles of the γ-butenyl 1-tosylate prepared in the preceding stage (a), in 200 ml of THF cooled to 0° C. The mixture is heated to ambient temperature (20° C.) and is stirred for 16 hours. 100 ml of an aqueous saline solution are added to the mixture and the product is extracted with ether (3' 75 ml). The organic fractions are dried over magnesium sulphate for 2 hours, filtered and the solvents are removed at reduced pressure to give a dark brown oily crude product. The crude product is distilled at reduced pressure to give γ-butenylcyclopentadiene in the form of a colourless oil.

Stage (c): Preparation of bis(γ-butenylcyclo-pentadienyl) dichlorohafnium (1):

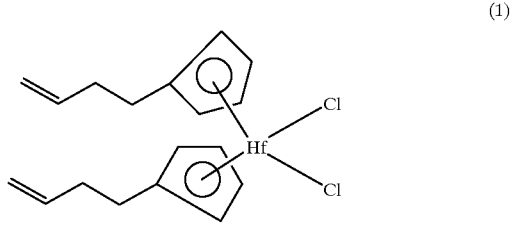

(1)

47.5 millimoles of butyllithium mixed with a $C_6$ alkane are added slowly to 47.5 millimoles of the γ-butenylcyclopentadiene prepared in the preceding stage (b), in 50 ml of THF at 0° C. and are stirred for 1 hours. The γ-butenylcyclopentadienyllithium solution thus produced is added to 19 millimoles of hafnium tetrachloride in 50 ml of THF at 0° C. and is stirred for 65 hours. The volatile compounds are removed under vacuum and the residue is extracted with ether and filtered. The product is precipitated in the form of a white solid by slowly cooling the solution to −50° C. and recrystallizing from ether at −12° C.

2. Preparation of a catalyst

Into a glass round bottom flask of 1-liter capacity, fitted with a stirring system, are introduced, at ambient temperature (20° C.) and under nitrogen atmosphere, 20 g of a silica sold by Crosfield (Great Britain) under trade reference "ES 70"® and predried for 5 hours at 800° C., a 10% (by weight) solution of methylaluminoxane containing 150 millimoles of aluminium in toluene, sold by Witco (Germany) and 1 millimole of bis(γ-butenylcyclopentadienyl) dichlorohafnium.

The mixture thus obtained is left stirred for 1 hour at ambient temperature and the toluene is then evaporated off by heating to 120° C. to obtain approximately 30 g of a solid catalyst containing 0.033 millimoles of hafnium per gram.

Example 2

Gas phase (co)polymerization of ethylene

The operation is carried out in a polymerization reactor containing a fluidized bed of 15 cm diameter, fitted with a gas compressor for recycling the gaseous fluidization mixture. 1 kg of a polyethylene powder originating from a previous polymerization carried out in the same conditions is introduced into the reactor to form the initial fluidized bed.

The reactor is pressurized at 80° C. with a gas mixture including ethylene and optionally 1-butene and hydrogen, according to a partial pressure of ethylene ($pC_2$) and ratios of partial pressures of hydrogen to ethylene ($pH_2/pC_2$) and of 1-butene to ethylene ($pC_4/pC_2$) as shown in Table 1. The fluidization speed is 25 cm/s.

Chloroform and the catalyst prepared in Example 1 are introduced into the reactor in quantities such as shown in Table 1. The temperature of the fluidized bed is kept constant at 80° C. throughout the (co)polymerization period which is shown in Table 1. At the end of the polymerization the reactor is cooled to ambient temperature (20° C.), degassed and purged with nitrogen. The quantity of (co)polymer thus manufactured is recovered and its density and melt index $MI_{2.16}$ are measured. The combined results appear in Table 1.

Table 1 brings together the comparative test No. 1 and No. 2, carried out in the absence of hydrogen and chloroform, comparative test No. 3 carried out in the presence of hydrogen but in the absence of chloroform, and tests No. 4, 5 and 6, carried out according to the present invention.

Analysis of Table 1 shows that the catalyst exhibits a high activity in the absence of hydrogen and of chloroform (comparative tests No. 1 and No. 2) but gives a copolymer of low melt index. In the presence of hydrogen and in the absence of chloroform (comparative test No. 3) the catalyst exhibits an activity which is, so to speak, nil and no polymer is produced. In tests No. 4, 5 and 6 the combined use of chloroform and of hydrogen enables the activity of the catalyst to be restored and (co)polymers with a melt index $MI_{2.16}$ which is high and even very high to be obtained.

Example 3

Preparation of a catalyst based on a zirconocene

Preparation of bis(β-propenylcyclopentadienyl)-dichlorozirconium (Stage (a): Preparation of β-propenycyclopenta-diene A solution of 0.44 mol of cyclopentadienyl-sodium in THF is added to a vigorously stirred solution of 0.35 mol of allyl bromide dissolved in 200 ml of THF at 0° C. The mixture is stirred for 2 hours during which the temperature returns to the ambient temperature (20° C.). 1500 ml of iced water are added to the mixture and an organic product is extracted with ether (3' 400 ml). The organic fractions are dried over magnesium sulphate overnight, filtered, and the solvents are removed at reduced pressure to give a light brown oily crude product. The crude product is distilled at reduced pressure to give β-propenylcyclo-pentadiene in the form of a colourless oil.

Stage (b): Preparation of bis(β-propenylcyclo-pentadienyl) dichlorozirconium (2):

(2)

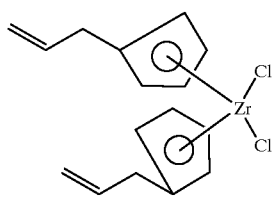

A solution of 0.105 mol of methyllithium in ether is added slowly to a solution, vigorously stirred at 0° C., of the β-propenylcyclopentadiene prepared in the preceding stage (a) in ether. The mixture is heated to ambient temperature (20° C.) and is kept stirred for 1 hours. A precipitate of β-propenylcyclopentadienyllithium is isolated by filtration, washed with ether 2' 100 ml) and dried to give a white powder. 47.5 millimoles of zirconium tetrachloride dissolved in 100 ml of THF are added to a vigorously stirred solution of β-propenylcyclopentadienyllithium in 100 ml of THF at 0° C. The mixture is heated to ambient temperature (20° C.) and is stirred for 16 hours. The volatile compounds are removed under vacuum and the residue is extracted with ether (4' 100 ml) and filtered. The product is obtained in the form of a white solid by slow cooling of the solution to −78° C. and recrystallization from cold ether.

2. Preparation of a catalyst

Into a glass round bottom flask of 5-liter capacity, fitted with a stirring system, are introduced at ambient temperature (20° C.) and under nitrogen atmosphere a 10% (by weight) solution of methylaluminoxane containing 15 moles of aluminium in toluene, sold by Witco (Germany) and 100 millimoles of the bis(β-propenylcyclopentadienyl) dichlorozirconium prepared previously. The mixture thus obtained is kept stirred for 15 minutes. 2 kg of a silica sold by Grace (United States) under trade reference "SD 3217.50" and predried at 800° C. for 5 hours are then introduced into the round bottom flask. The mixture thus obtained is left stirred for 1 hour at ambient temperature and the toluene is then evaporated off by heating to 120° C. to obtain a solid catalyst containing a zirconocene.

Example 4

Gas phase polymerization of ethylene

The operation is carried out in a stainless steel gas phase polymerization reactor with a capacity of 2.6 liters, fitted with a mechanical stirring system and a jacket enabling the reactor to be heated or cooled. 400 g of sodium chloride are introduced into the reactor under nitrogen atmosphere as an initial bed. The reactor is heated to 80° C. and the catalyst prepared in Example 3 is introduced into it. Ethylene is then introduced into the reactor until a partial pressure ($pC_2$) of 0.8 MPa is obtained, which is kept constant throughout the polymerization period by addition of ethylene. Hydrogen is added initially to the ethylene so as to attain a desired ratio of partial pressure of hydrogen to that of ethylene ($pH_2:pC_2$). Chloroform is initially introduced into the reactor. At the end of the polymerization the sodium chloride is removed by washing with water and a polyethylene powder is recovered.

The polymerization conditions and the results obtained for the polyethylenes manufactured are brought together in Table 2.

Table 2 brings together the comparative test No. 7 carried out in the absence of hydrogen and chloroform, comparative test No. 8 carried out in the absence of chloroform and in the presence of hydrogen and tests No. 9 and 10 carried out according to the present invention.

Analysis of Table 2 shows that the catalyst exhibits a high activity in the absence of hydrogen and chloroform (comparative test No. 7). However, the presence of hydrogen and in the absence of chloroform (comparative test No. 8), the catalyst exhibits a very low activity. In test No. 9 and No. 10 the combined use of chloroform and of hydrogen enables the catalyst activity to be restored and polymers of high melt index to be obtained.

TABLE 1

Tests No. 1 to 6

| Test | $pC_2$ (MPa) | $pH_2:pC_2$ | $PC_4:pC_2$ | $CHCl_3$ (mmol) | Hf (mmol) | Time (h) | (co)polymer (g) | Density g/cm³ | $MI_{2.16}$ (g/10 min) |
|---|---|---|---|---|---|---|---|---|---|
| No. 1 (comparative) | 1.25 | 0 | 0.036 | 0 | 0.15 | 3.1 | 1700 | 0.920 | 0.04 |
| No. 2 (comparative) | 0.96 | 0 | 0.040 | 0 | 0.17 | 4.7 | 2500 | 0.912 | 0.06 |
| No. 3 (comparative) | 0.96 | 0.001 | 0.038 | 0 | 0.15 | 3.0 | 0 | | |
| No. 4 | 0.97 | 0.001 | 0.032 | 2 | 0.22 | 3.5 | 2200 | 0.921 | 2 |
| No. 5 | 0.97 | 0.005 | 0.031 | 2 | 0.25 | 3.6 | 1800 | 0.924 | 100 |
| No. 6 | 0.97 | 0.001 | 0 | 1.5 | 0.15 | 3.3 | 1700 | 0.96 | 1 |

TABLE 2

Tests No. 7 to 10

| Test | $pC_2$ (MPa) | $pH_2:pC_2$ | $CHCl_3$ (mmol) | Zr (mmol) | Time (h) | Quantity of polymer (g) | $MI_{2.16}$ (g/10 min) |
|---|---|---|---|---|---|---|---|
| No. 7 (comparative) | 0.8 | 0 | 0 | 0.014 | 2.5 | 291 | 0.9 |
| No. 8 (comparative) | 0.8 | 0.006 | 0 | 0.014 | 0.4 | (small) | — |
| No. 9 | 0.8 | 0.006 | 0.003 | 0.020 | 2.4 | 310 | 5 |
| No. 10 | 0.8 | 0.006 | 0.00001 | 0.014 | 4.0 | 476 | 4 |

I claim:

1. Process for polymerization of at least one olefin with the aid of a solid form catalyst system including a catalyst containing at least one organometallic compound of a transition metal possessing at least one ligand of cyclopentadienyl or substituted cyclopentadienyl, wherein the polymerization is carried out in the gas phase in the presence of hydrogen and chloroform.

2. Process according to claim 1 characterized in that the transition metal of the organometallic compound of the catalyst is selected from the group consisting of titanium, zirconium and hafnium.

3. Process according to claim 1 characterized in that the organometallic compound of the catalyst corresponds to one of the following formulae:

$(C_5R'_m)_p R''_s (C_5R'_m) MeQ_{3-p}$ or $R''_s (C_5R'_m)_2 MeQ'$ in which Me denotes an atom of transition metal from groups IVA, VA or VIA of the Periodic Classification of the elements, $(C_5R'_m)$ denotes a cyclopentadienyl or substituted cyclopentadienyl radical, each R', being identical or different, denotes a hydrogen atom or an alkyl, alkylene, aryl or aralkyl radical, or two substituents R' together form a condensed ring, R" denotes an alkylene radical, a dialkylgermanium or a silicon atom or an alkylphosphine radical or an amine radical joining the two $(C_5R'_m)$ rings via a bridge, each Q, being identical or different, denotes an aryl, alkyl, alkylene or aralkyl radical or a halogen atom, Q' denotes an alkylidene radical, s is 0 or 1, p is 0, 1 or 2; on condition that s is 0 when p is 0; m is 4 when s is 1 and m is 5 when s is 0.

4. Process according to claim 1 characterized in that the organometallic compound of the catalyst corresponds to the formula

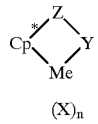

in which Me denotes an atom of transition metal from groups IVA, VA or VIA of the Periodic Classification of the elements, $C_p^*$ denotes a cyclopentadienyl or substituted cyclopentadienyl radical bound in an $\eta^5$ bonded mode to Me, Z denotes a divalent group including boron or an element from group IVB and optionally sulphur or oxygen, and optionally $C_p^*$ and Z together form a condensed ring, each X, being identical or different, denotes an anionic ligand or a neutral Lewis base, n is 0, 1, 2, 3 or 4, depending on the valency of Me, and Y denotes an anionic or non-anionic ligand bonded to Z and Me, including nitrogen, phosphorus, oxygen or sulphur, and optionally, Y and Z together form a condensed ring.

5. Process according to claim 1 characterized in that the catalyst system includes an organometallic compound cocatalyst having a metal selected from a group of the Periodic Classification of the elements consisting of Groups IA, IIA, IIB and IIIB.

6. Process according to claim 5, characterized in that the metal is selected from the group consisting of lithium, aluminium, magnesium, zinc and boron.

7. Process according to claim 5, characterized in that the cocatalyst is an organoaluminium compound selected from the group consisting of trialkylaluminium, alkylaluminium hydrides or halides or alcoholates and alkylaluminoxanes.

8. Process according to claim 7, characterized in that the cocatalyst is employed in a quantity such that the atomic ratio of the transition metal of the catalyst to the metal of the cocatalyst is from 1:10000 to 10000:1 in the case of the alkylaluminoxanes and from 1:100 to 100:1 in the case of the other organometallic compounds.

9. Process according to claim 1 characterized in that the halogenated hydrocarbon is employed in a quantity such that the ratio of the number of moles of the halogenated hydrocarbon to the number of gram-atoms of transition metal of the catalyst is from 1:10000 to 100:1.

10. Process according to claim 1 characterized in that hydrogen is employed in a quantity such that the ratio of the partial pressure of hydrogen to that of the olefins(s) is from 1:10000 to 1:10.

11. Process according to claim 1 characterized in that the polymerization is carried out in gaseous phase in a reactor containing a fluidized and/or mechanically stirred bed.

12. Process according to claim 1 characterized in that the polymerization is carried out continuously and that the halogenated hydrocarbon is introduced continuously into the polymerization mixture.

13. Process according to claim 1 characterized in that ethylene is polymerized optionally with at least one olefin containing from 3 to 10 carbon atoms.

14. A process as defined in claim 1 wherein said organometallic compound possesses an alkenyl cyclopentadienyl ligand.

* * * * *